United States Patent [19]

Watanabe et al.

[11] Patent Number: 4,992,989

[45] Date of Patent: Feb. 12, 1991

[54] ULTRASOUND PROBE FOR MEDICAL IMAGING SYSTEM

[75] Inventors: Kazuhiro Watanabe, Tokyo; Atsuo Iida, Yokohama; Fumihiro Namiki, Machida; Kenji Kawabe, Yokohama, all of Japan

[73] Assignee: Fujitsu Limited, Kawasaki, Japan

[21] Appl. No.: 346,527

[22] Filed: May 2, 1989

[30] Foreign Application Priority Data

May 19, 1988 [JP] Japan ................................ 63-122438

[51] Int. Cl.[5] ................................................ G03B 42/06

[52] U.S. Cl. ..................................... 367/7; 128/662.03

[58] Field of Search .................... 367/7, 105, 138, 157, 367/162; 128/662.03, 663.01; 73/625, 626

[56] References Cited

U.S. PATENT DOCUMENTS 4,462,092 7/1984 Kawabuchi et al. ............... 367/105

4,643,028 2/1987 Kondo et al. ........................ 367/105

FOREIGN PATENT DOCUMENTS 58-118739 7/1983 Japan .

*Primary Examiner*—Thomas H. Tarcza

*Assistant Examiner*—Daniel T. Pihulic

*Attorney, Agent, or Firm*—Staas & Halsey

[57] ABSTRACT

An ultrasound probe for a medical imaging system, comprising an ultrasound absorber and a piezoelectric vibrator mounted on the ultrasound absorber, cut in the direction from the surface of the piezoelectric vibrator to the ultrasound absorber into an array by a plurality of cutting grooves. The cutting depth d of each cutting groove in the ultrasound absorber is determined as an integer multiple of a quarter of a wave length λ corresponding to a center frequency $f_0$ of ultrasound waves radiated from the piezoelectric vibrator. Consequently, symmetrical electro-acoustic conversion characteristics of the ultrasound probe can be obtained in the frequency domain.

6 Claims, 6 Drawing Sheets

$$d = \frac{\lambda}{4} n \quad (n = 1, 2, \cdots)$$

$$d = \frac{\lambda}{4} n \quad (n = 1, 2, \cdots)$$

$$d = \frac{\lambda}{4} n \quad (n = 1, 2, \cdots)$$

ULTRASOUND PROBE FOR MEDICAL IMAGING SYSTEM

BACKGROUND OF THE INVENTION

1. Field of the Invention

The present invention relates to an ultrasound probe for a medical imaging system, more particularly, to an array type ultrasound probe for a medical imaging system using an ultrasound wave.

The ultrasound probe, which is used as an analog front end for a medical imaging system, provides a large number of independent channels, transduces electric signals to acoustic pressure, and generates sufficient acoustic energy to illuminate the various structures in the human body. Further, the ultrasound probe converts the weak returning acoustic echoes to a set of electrical signals which can be processed into an image.

2. Description of the Related Art

Conventionally, an ultrasound probe for a medical imaging system comprises an ultrasound absorber and a piezoelectric vibrator mounted on the ultrasound absorber, and is cut from the surface of the piezoelectric vibrator to the ultrasound absorber into the form of an array by a plurality of cutting grooves. Such an ultrasound probe is disclosed in Japanese Unexamined Patent Publication (Kokai) No. 58-118739.

However, in the prior art, the cutting depth d of each cutting groove was not considered, since the relationship between the cutting depth d and the gain has not been studied sufficiently. Therefore, symmetrical electro-acoustic conversion characteristics of the prior ultrasound probe cannot be satisfactorily obtained in the frequency domain.

SUMMARY OF THE INVENTION

It is an object of the present invention to provide an ultrasound probe for a medical imaging system having preferable frequency characteristic by way of determining, or defining, a specific valve of the depth d of each cutting groove in an ultrasound absorber.

According to the present invention, there is provided an ultrasound probe for a medical imaging system having an ultrasound absorber and a piezoelectric vibrator mounted on the ultrasound absorber. The ultrasound probe is cut from the surface of the piezoelectric vibrator to the ultrasound absorber into the form of an array by a plurality of cutting grooves. The cutting depth d of each of the cutting grooves in the ultrasound absorber is determined by the equation: $d=n\cdot(\lambda/4)$, where, the reference $\lambda$ is a wave length corresponding to a center frequency $f_o$ of ultrasound waves radiated from the piezoelectric vibrator, and the coefficient n is a natural number.

According to the present invention, there is also provided an ultrasound probe for a medical imaging system comprising an ultrasound absorber for absorbing unnecessary ultrasound waves, an first electrode mounted on the ultrasound absorber, a piezoelectric vibrator mounted on the first electrode for radiating an ultrasound wave, a second electrode mounted on the piezoelectric vibrator for driving said piezoelectric vibrator together with the first electrode, and an acoustic matching layer mounted on the second electrode for acoustic impedance matching between the human body and the piezoelectric vibrator. The ultrasound probe is cut from the surface of the acoustic matching layer to the ultrasound absorber in the form of an array by a plurality of cutting grooves. A cutting depth d of each of the cutting grooves in the ultrasound absorber is determined by the equation: $d=n\cdot(\lambda/4)$, where, the reference $\lambda$ is a wave length corresponding to a center frequency $f_o$ of ultrasound waves radiated from the piezoelectric vibrator, and the coefficient n is a natural.

Further, the coefficient n may be determined to an even number or an odd number.

BRIEF DESCRIPTION OF THE DRAWINGS

The present invention will be more clearly understood from the description of the preferred embodiments as set forth below with reference to the accompanying drawings, wherein.

DESCRIPTION OF THE PREFERRED EMBODIMENTS

For a better understanding of the preferred embodiments, the problems of the prior art will be first explained with reference to FIG. 1.

Figure 1:
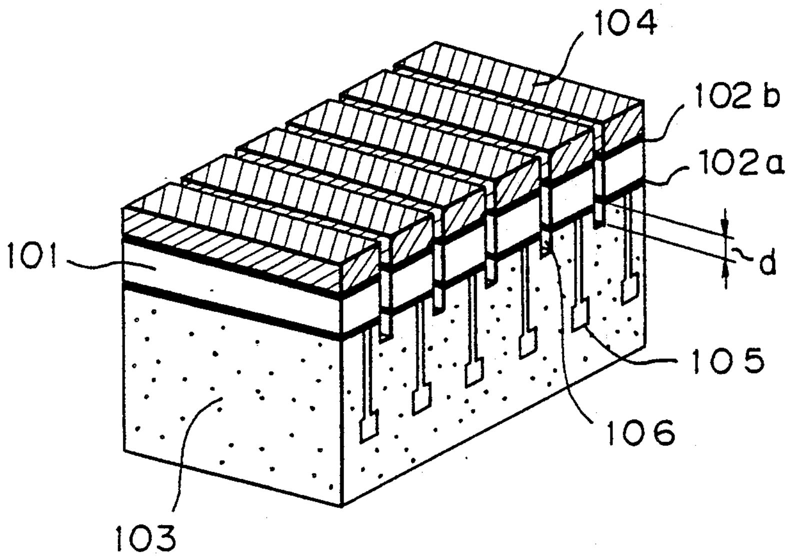
Fig. 1 (PRIOR ART)
FIG. 1 is a perspective view showing one example of a prior ultrasound probe for a medical imaging system.

FIG. 1 is a perspective view showing one example of a prior art ultrasound probe for a medical imaging system. In FIG. 1, reference numerals 101 denotes a piezoelectric vibrator, 102*a* and 102*b* denote electrodes, 103 denotes an ultrasound absorber, 104 denotes an acoustic matching layer, 105 denotes a lead, and 106 denotes cutting grooves, and reference d denotes the depth of the cutting grooves 106 in the ultrasound absorber.

The prior art ultrasound probe comprises an ultrasound absorber 103, piezoelectric vibrator 101, first and second electrodes 102*a* and 102*b*, and an acoustic matching layer 104. The ultrasound absorber 103 is used for absorbing unnecessary ultrasound waves radiated from the piezoelectric vibrator 101. The piezoelectric vibrator 101 is mounted on the ultrasound absorber 103 through the first electrode 102*a*, and the acoustic matching layer 104 is mounted on the piezoelectric vibrator 101 through the second electrode 102*b*. Namely, the piezoelectric vibrator 101 is positioned between the first electrode 102*a* and the second electrode 102*b* and driven by the first and second electrodes 102*a* and 102*b*. Note, the acoustic matching layer 104 is used for acoustic impedance matching between the human body and the piezoelectric vibrator 101.

Further, the prior ultrasound probe is cut from the surface of the acoustic matching layer 104 toward the ultrasound absorber 103 into the form of an array by the plurality of cutting grooves 106. Note, the cutting depth of each cutting groove 106 is not considered, and the relationship between the cutting depth and gain has not been studied sufficiently, and thus the depth of each cutting groove 106 is scattered, or random. In some cases, the ultrasound absorber 103 is deeply cut by the cutting grooves 106 out of necessity, and in other cases, the ultrasound absorber 103 is shallowly cut or is not cut at all by the cutting grooves 106, and the depth of the cutting grooves 106 in the supersonic absorber 103 is not defined to be specific value. Consequently, symmetrical electro-acoustic conversion characteristics of the prior art ultrasound probe cannot be satisfied in the frequency domain.

An object of the present invention, in consideration of the above-mentioned problems, is to provide an ultrasound probe for a medical imaging system having a preferable frequency characteristic by way of determining the depth of each cutting groove to be the specific value.

Next, an ultrasound diagnostic apparatus using an ultrasound probe for a medical imaging system according to the present invention will be explained.

The ultrasound diagnostic apparatus is, for example, used for diagnosing a human body by using an ultrasound wave. Namely, the ultrasound diagnostic apparatus diagnoses internal organs or tumors of the human body by their shapes or the acoustic characteristics thereof. Note, recently, the acoustic characteristics of tissues in the internal organs or tumors are, for example, characterized by an attenuation coefficient and a scattered coefficient. When the attenuation coefficient and the scattered coefficient are used in the ultrasound diagnostic apparatus, a pervasive disease such as cancer of the liver can be detected; furthermore, a myocardial infraction can be detected by the ultrasound diagnostic apparatus.

Figure 2:
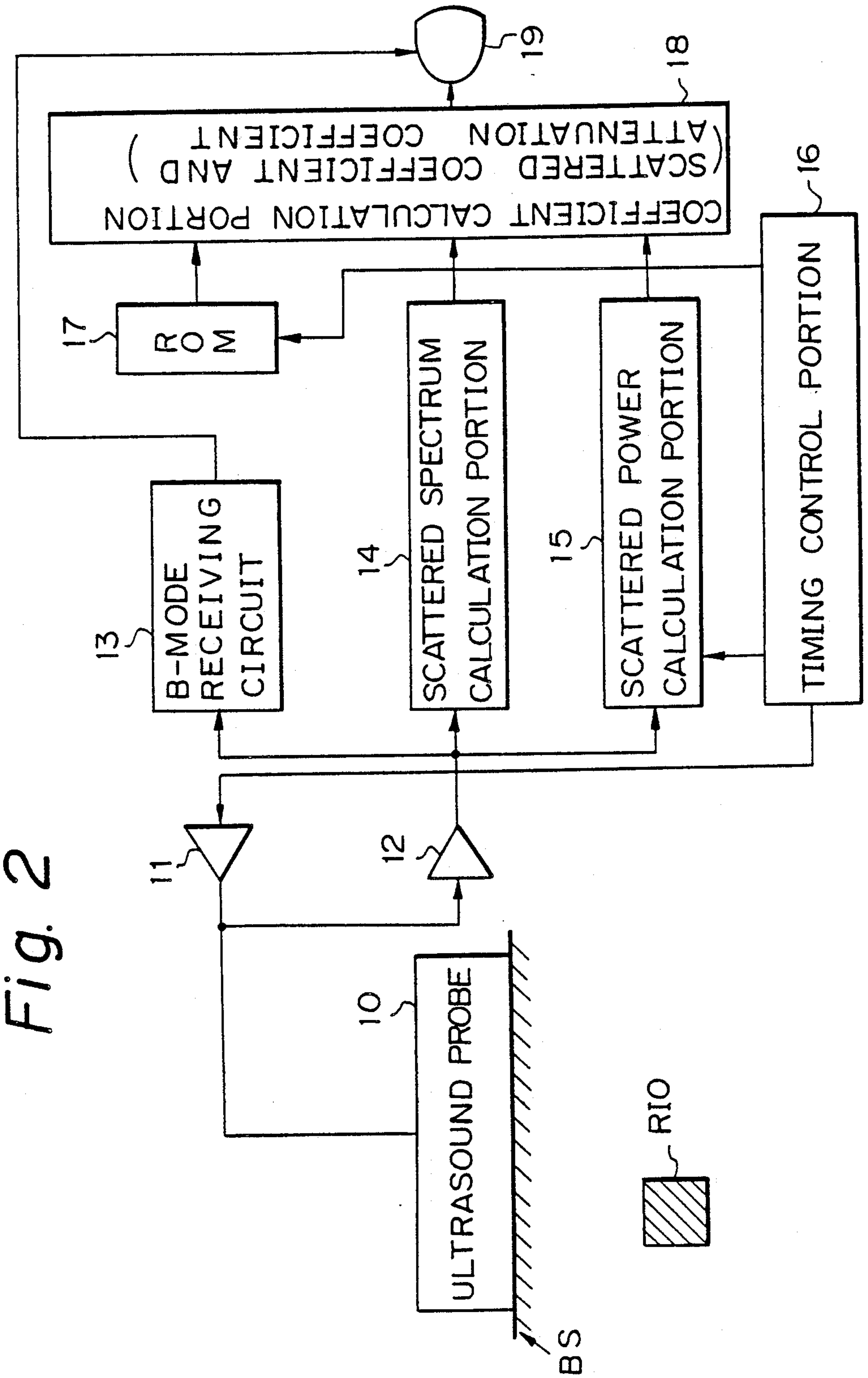
FIG. 2 is a block diagram showing an example of an ultrasound diagnostic apparatus using an ultrasound probe for a medical imaging system according to the present invention.

FIG. 2 is a block diagram showing an example of an ultrasound diagnostic apparatus using an ultrasound probe for a medical imaging system according to the present invention. In FIG. 2, reference numerals 10 denotes an ultrasound probe, 11 denotes a transmitting amplifier, 11 denotes a receiving amplifier, 19 denotes a display, and references BS denotes a body surface and ROI denotes a region of interest.

The ultrasound probe 10 is used for radiating an ultrasound beam to a region of interest ROI in a human body through the body surface BS, and receiving an ultrasound wave reflected by the region of interest ROI. The transmitting amplifier (which is an ultrasound pulser) 11, supplied with signals from a timing control portion 16, is used for driving the ultrasound probe 10 by inputting pulse signals to the ultrasound probe 10. The receiving amplifier 12 is used for amplifying the ultrasound wave signals received by the ultrasound probe 10. An output signal of the receiving amplifier 12 is supplied to a B-mode receiving circuit 13, a scattered spectrum calculation portion 14, and a scattered power calculation portion 15, respectively. Note, the region of interest ROI is, for example, a part of any of the internal organs, tumors, etc., which are suspected of a disease.

The B-mode receiving circuit 13 generates a B-mode image by luminance signals corresponding to the signal strength of the reflected ultrasound wave signals output from the receiving amplifier 12. An output signal of the B-mode receiving circuit 13 is supplied to the display 19. The scattered spectrum calculation portion 14 is used for calculating a scattered spectrum based on the ultrasound wave signals output from the receiving amplifier 12. The scattered power calculation portion 15 is used for calculating the scattered ultrasound wave power based on the ultrasound wave signals output from the receiving amplifier 12.

The timing control portion controls the timing of various signals, and output signals of the timing control portion 26 are supplied to the scattered power calculation portion 15 and a ROM 17. The ROM 17 is a read only memory for storing various data at specified addresses. The stored data of the ROM 17 are, for example, scattered characteristics of the ultrasound beam, transmit and receive characteristics, and power transfer functions including frequency characteristics of the ultrasound diagnostic apparatus.

Output signals of the scattered spectrum calculation portion 14, the scattered power calculation portion 15, and the ROM 17 are supplied to a coefficient calculation portion 18. The coefficient calculation portion 18 is used for calculating an attenuation coefficient, a scattered coefficient, etc., and the output of the coefficient calculation portion 18 is supplied to the display 19. Consequently, the display 19 is able to indicate both a B-mode picture image and a picture image characterized by the scattered coefficient and the attenuation coefficient.

Below, the preferred embodiments of the present invention will be explained with reference to FIGS. 3 to 9.

Figure 3:
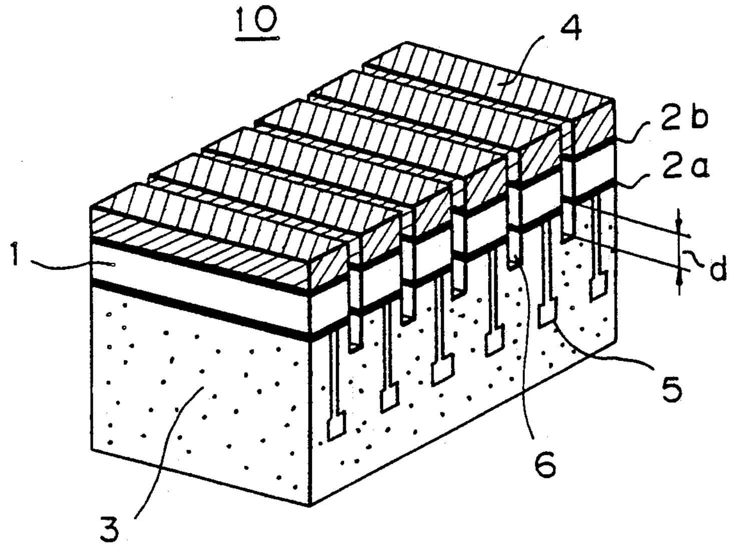
FIG. 3 is a perspective view showing an embodiment of an ultrasound probe for a medical imaging system according to the present invention.
Figure 4:
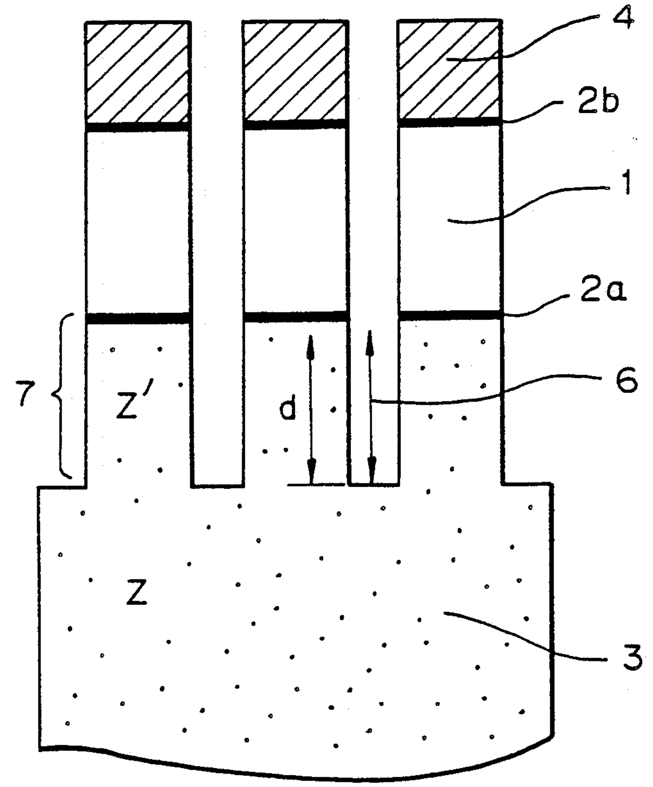
FIG. 4 is a partly diagrammatic and sectional view showing an example of the ultrasound probe shown in FIG. 2.

FIG. 3 is a perspective view showing an embodiment of an ultrasound probe for a medical imaging system according to the present invention, and FIG. 4 is a partly diagrammatic and sectional view showing an example of the ultrasound probe shown in FIG. 3. In FIGS. 3 and 4, reference numeral 1 denotes a piezoelectric vibrator, 2*a* and 2*b* denote electrodes, 3 denotes an ultrasound absorber, 4 denotes an acoustic matching layer, 5 denotes a lead, 6 denotes cutting grooves, and the references d denote the depth of the cutting grooves 6 in the ultrasound absorber, Z denotes the acoustic impedance of the ultrasound absorber 4, and Z′ denotes the acoustic impedance of a cut portion in the ultrasound absorber 4.

The ultrasound probe of the present embodiment comprises an ultrasound absorber 3, a piezoelectric vibrator 1, first and second electrodes 2*a* and 2*b*, and an acoustic matching layer 4 as shown in FIG. 3. The ultrasound absorber 3 is used for absorbing unnecessary ultrasound wave radiated from the piezoelectric vibrator 1. The piezoelectric vibrator 1 is mounted on the ultrasound absorber 3 through the first electrode 2*a*, and the acoustic matching layer 4 is mounted on the piezoelectric vibrator 1 through the second electrode 2*b*. Namely, the piezoelectric vibrator 1 is positioned between the first electrode 2*a* and the second electrode 2*b* and driven by the first and second electrodes 2*a* and 2*b*. Note, the acoustic matching layer 4 is used for matching the ultrasound wave radiated from the piezoelectric vibrator 1.

Further, the ultrasound probe is cut from the surface of the acoustic matching layer 4 to the ultrasound absorber 3 into an array by a plurality of cutting grooves 6 as shown in FIG. 4. This configuration of the ultrasound probe of the present embodiment is same as the prior ultrasound probe of FIG. 1. The difference between the present ultrasound probe and the prior ultrasound probe exists in the specific cutting depth d of each cutting groove 6. Namely, a cutting depth d of each of the cutting grooves d in the ultrasound absorber 3 of the present invention is determined by the equation $d=N\cdot(\lambda/4)$, where, the reference λ is a wave length corresponding to a center frequency $f_o$ of ultrasound waves radiated from the piezoelectric vibrator, and the coefficient n is a natural number.

Below, the effect on the frequency characteristics of an ultrasound probe by changing the depth d of each cutting groove 6 will be explained.

In FIGS. 3 and 4, when an ultrasound absober 3 is cut by cutting grooves 6, the acoustic velocity of a cut portion 7 of the ultrasound absober 3 is lower than that of a non-cut portion thereof. Further, the acoustic impedance Z' of the cut portion 7 is smaller than the acoustic impedance Z of the non-cut portion in the ultrasound absober 3. Therefore, in the case that a plurality of cutting grooves 6 are cut into the ultrasound absober 3 as shown in FIG. 4, the cutting depth d of each of the cutting grooves 6 is determined by the equation: $d=N\cdot(\lambda/4)$, where, the reference λ is a wave length corresponding to a center frequency $f_o$ of ultrasound waves radiated from the piezoelectric vibrator 1, and the coefficient n is a natural number. This configuration is equivalent to that of a new layer of a depth d having an acoustic impedance Z', which smaller than an acoustic impedance Z, is mounted to rear of piezoelectric vibrator 1. Therefore, an ultrasound probe according to the present embodiment includes a new acoustic matching layer located to the rear of the piezoelectric vibrator 1, and the new acoustic matching layer has a depth of d and an impedance of Z'. When the depth d of the new, rear acoustic matching layer is changed, the frequency characteristics of the ultrasound probe are changed as shown in FIGS. 5 to 8.

Figure 5:
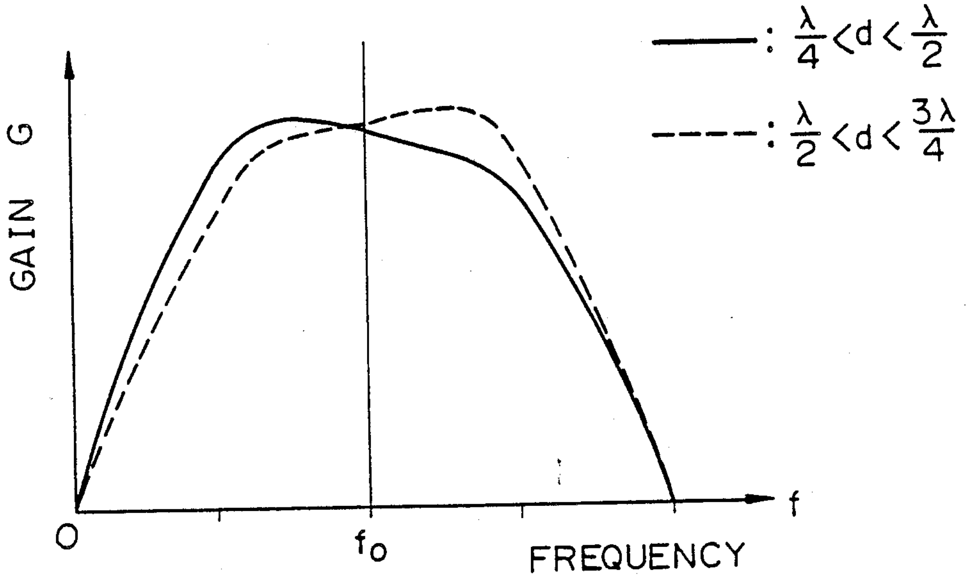
FIG. 5 is a diagram showing an example of the gain-frequency characteristics to the present of an ultrasound probe according to the present invention.

FIG. 5 is a diagram showing an example of the gain-frequency characteristics of an ultrasound probe according to the present invention. In FIG. 5, the gain relative to frequency is shown for two cases of the depth d of each of the cutting grooves 6 one in the range of λ/4 to λ/2 (which is indicated by a solid line), and the other in the range of λ/2 to 3λ/4 (which is indicated by a dot line).

As indicated by these curves, when the depth d of each of the cutting grooves 6 is between the two specific end values of the two ranges, a peak of the gain G tends to be either in a high frequency direction or a low frequency direction and thus is asymmetrical. Namely, when the cutting depth d of each of the cutting grooves 6 is determined by the ranges: $\lambda/4<d<\lambda/2$ or $\lambda/2<d<3\lambda/4$, the gain-frequency characteristics of the ultrasound probe are not symmetrical in relation to a center frequency $f_o$ of ultrasound waves which are radiated from the piezoelectric vibrator 1 and are of the wave length λ.

Figure 6:
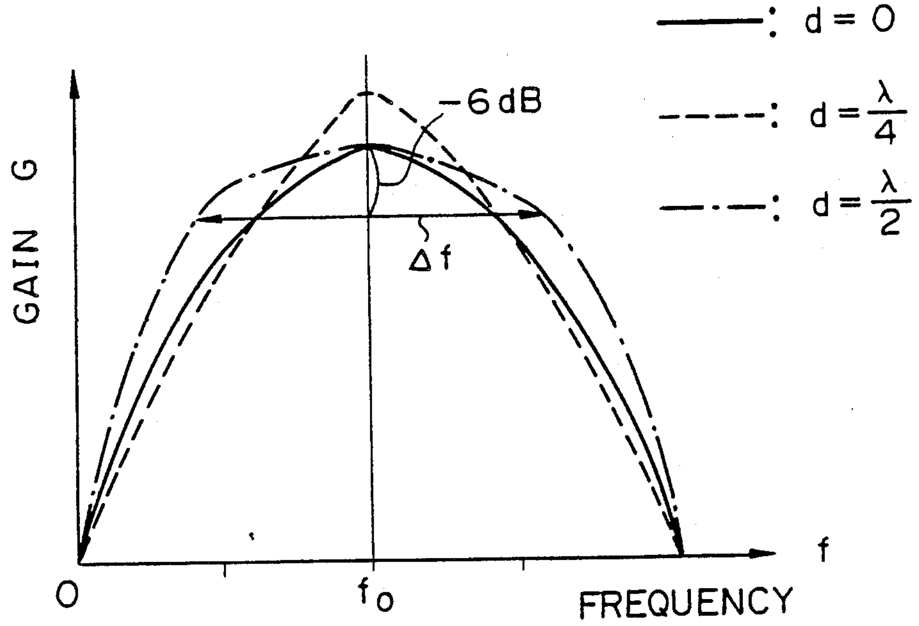
FIG. 6 is a diagram showing an another example of the gain-frequency characteristics of an ultrasound probe according to the present invention.

FIG. 6 is a diagram showing an other example of the gain-frequency characteristics of an ultrasound probe according to the present invention. In FIG. 6, the gain relative to frequency relationship is shown for three different values each of the cutting grooves 6 corresponding to 0, λ/4 and λ/2. As indicated by these curves, when the depth d of each of the cutting grooves 6 is determined by an integer (which includes zero) times a ¼ wave length λ, the frequency characteristics become symmetrical. Namely, when the cutting depth d of each of the cutting grooves 6 is determined by the equation: $d=n\cdot(\lambda/4)$, where, n=1, 2, . . . , the gain-frequency characteristics of the ultrasound probe are symmetrical in regard to a center frequency $f_o$ of the ultrasound waves which are radiated from the piezoelectric vibrator 1 and correspond to the wave length λ. Furthermore, when a depth d of each of the cutting grooves 6 equals ¼λ, the gain G reaches a highest value, and when the depth d of each of the cutting grooves 6 equals ½λ, a band width of the gain G reaches a broadest value.

Figure 7:
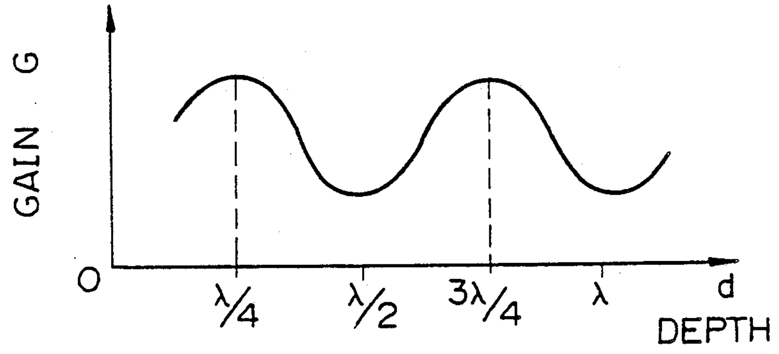
FIG. 7 is a diagram showing an example of the relationship between the gain and the depth of a groove in an ultrasound probe according to the present invention.

FIG. 7 is a diagram showing an example of the relationship between gain (an ultrasound radiation gain of a center frequency $f_o$) G and a depth d of a groove 6 in an ultrasound probe according to the present invention. As indicated by this curve, when a depth d of each of the cutting grooves 6 is determined to be an multiple odd of ¼λ, the gain G reaches a highest value. Namely, when the cutting depth d of each of the cutting grooves 6 is determined by the equation: $d=n\cdot(\lambda/4)$, where, N=1, 3, 5, . . . , the gain G is positioned at a local maximum.

Figure 8:
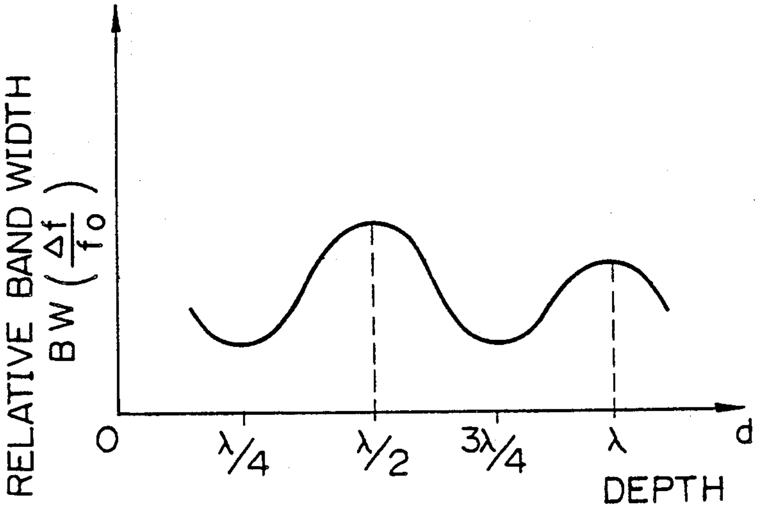
FIG. 8 is a diagram showing an example of the relationship between the relative band width and the depth of a groove in an ultrasound probe according to the present invention.

FIG. 8 is a diagram showing an example of the relationship between relative band width ($\Delta f/f_o$) BW and the depth d of a groove 6 in an ultrasound probe according to the present invention. Note, the relative band width is a value defined by the band width Δf, at positions lower by −6 dB than the gain G of the center frequency $f_o$, OO divided by the center frequency $f_o$, when the depth d of each of the cutting grooves 6 is changed to various values. As indicated by this curve, when the depth d of the cutting grooves 6 is determined to be an even multiple of ¼λ, the relative band width BW reaches a highest value. Namely, when the cutting depth d of each of the cutting grooves 6 is determined by the equation: $d=n\cdot(\lambda/4)$, where, n=2, 4, 6, . . . , the relative band width BW is positioned at a local maximum.

Therefore, an ultrasound probe having a symmetrical frequency characteristic can be provided by determining depth d of each of the cutting grooves 6 by the equation: $d=n\cdot(\lambda/4)$, where, n=1, 2, . . . . Note, when the coefficient n is determined to be an odd number, an ultrasound probe having a symmetrical frequency characteristic and a high gain G can be provided. Further, when the coefficient n is determined to be an even number, an ultrasound probe having a symmetrical frequency characteristic and a high gain G can be provided. Further, when the coefficient n is determined to be an even number, an ultrasound probe having a symmetrical frequency characteristic and a high relative band width BW can be provided.

Next, a method of manufacturing an ultrasound probe will be described with reference to FIG. 3. First, electrodes 2a and 2b are mounted on both of the opposite sides of the piezoelectric vibrator 1. Next, an acoustic matching layer 4 is mounted on the front surface of the piezoelectric vibrator 1, and an ultrasound absorber 3 is mounted on the rear surface of the piezoelectric vibrator 1. Further, the ultrasound probe is cut in the direction from the acoustic matching layer 4 to the ultrasound absorber 3, and thus through the piezoelectric vibrator 1 and the electrodes 2a and 2b, by a plurality of cutting grooves 6. Note, the depth d of each of the cutting grooves 6 is determined by the equation: $d=n\cdot(\lambda/4)$, where the reference $\lambda$ is the wave length corresponding to the center frequency $f_o$ of ultrasound waves radiated from the piezoelectric vibrator, and the coefficient n is a natural number.

Figure 9:
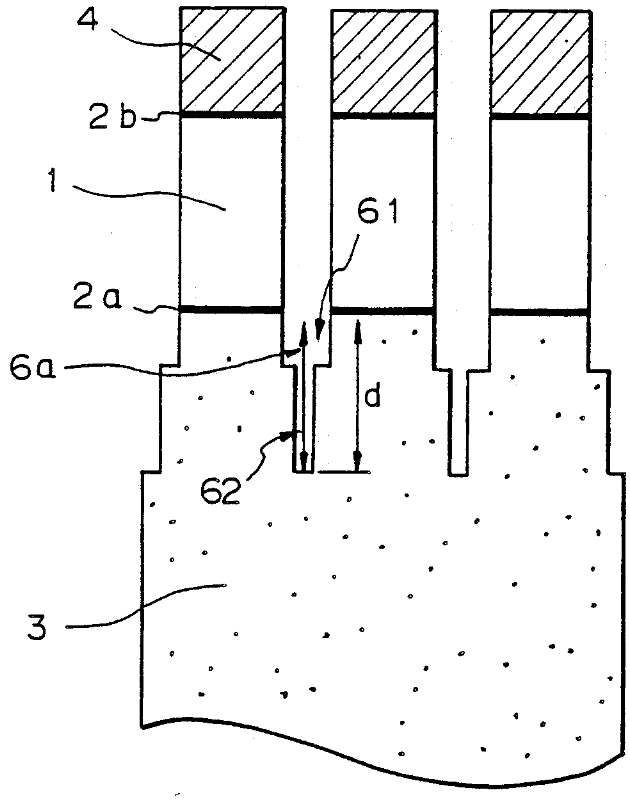
FIG. 9 is a partly diagrammatic and sectional view showing a modification of the ultrasound probe shown in FIG. 4.

FIG. 9 is a partly diagrammatic and sectional view showing a modification of the ultrasound probe shown in FIG. 4. As compared with the embodiment of FIG. 4, the difference between the embodiment of FIG. 4 and the modification of FIG. 9 is only in the shape of the cutting grooves. Namely, the cutting grooves 6 of the embodiment shown in FIG. 4 are formed only by a wide cutting portion, whereas each of the cutting grooves *6a* of the modification shown in FIG. 9 is formed by a wide cutting portion 61 and a narrow cutting portion 62. The cutting grooves *6a* of the modification of the ultrasound probe of FIG. 9 can have the same coefficients as the cutting grooves 6 of the embodiment shown in FIG. 4.

As described above, according to the present invention, when a piezoelectric vibrator 1 is divided in the form of an array type ultrasound probe, a depth d of a cutting groove 6 in an ultrasound absorber 3 is determined as an integer multiple of $\frac{1}{4}$wave length $\lambda$ corresponding to a center frequency $f_o$ of an ultrasound wave generated by the piezoelectric vibrator 1, an array type ultrasound probe having preferable and stable ultrasound frequency characteristics, for example, a symmetrical configuration, a high efficiency and a broad relative band, can be provided.

Many widely differing embodiments of the present invention may be constructed without departing from the spirit and scope of the present invention, and it should be understood that the present invention is not limited to the specific embodiments described in the specification, except as defined in the appended claims.

We claim:

1. An ultrasound probe for a medical imaging system having an ultrasound absorber and a piezoelectric vibrator mounted on said ultrasound absorber, said ultrasound probe being cut by a plurality of cutting grooves, extending in the direction from the surface of said piezoelectric vibrator to said ultrasound absorber, into an array the cutting depth d of each said cutting groove in said ultrasound absorber being determined by the following equation:

$$d=n\cdot(\lambda/4)$$

where, reference $\lambda$ is the wave length corresponding to the center frequency $f_0$ of the ultrasound waves radiated from said piezoelectric vibrator, and the coefficient n is a natural number.

2. An ultrasound probe for a medical imaging system according to claim 1, wherein said coefficient n is determined to be an odd number.

3. An ultrasound probe for a medical imaging system according to claim 1, wherein said coefficient n is determined to be an even number.

4. An ultrasound probe for a medical imaging system comprises:

an ultrasound absorber for absorbing unnecessary ultrasound waves;

a first electrode, mounted on said ultrasound absorber;

a piezoelectric vibrator, mounted on said first electrode, for radiating an ultrasound wave;

a second electrode, mounted on said piezoelectric vibrator, for driving said piezoelectric vibrator together with said first electrode;

an acoustic matching layer, mounted on said second electrode, for matching the ultrasound wave; and said ultrasound probe being cut by a plurality of cutting groves, extending in the direction from the surface of said acoustic matching layer to said ultrasound absorber, into an array, the cutting depth d of each said cutting groove in said ultrasound absorber being determined by the following equation:

$$d=n\cdot(\lambda/4)$$

where, reference $\lambda$ is the wave length corresponding to the center frequency $f_0$ of ultrasound waves radiated from said piezoelectric vibrator, and the coefficient n is a natural number.

5. An ultrasound probe for a medical imaging system according to claim 4, wherein said coefficient n is determined to be an even number.

6. An ultrasound probe for a medical imaging system according to claim 4, wherein said coefficient n is determined to be an odd number.

* * * * *

UNITED STATES PATENT AND TRADEMARK OFFICE

CERTIFICATE OF CORRECTION

PATENT NO. : 4,992,989

DATED : February 12, 1991

INVENTOR(S) : Kazuhiro WATANABE et al.

It is certified that error appears in the above-identified patent and that said Letters Patent is hereby corrected as shown below:

Col. 1, line 40, change "valve" to --value--;
line 58, change "an" to --a--.

Col. 2, line 6, after "natural" insert --number--;
line 7, after "to" insert --be--;
line 29, delete "to the present";
line 31, delete "an".

Col. 3, line 20, after "to be" insert --a--;
line 28, change "the" (second occurrence) to --a--;
line 52, change "11" to --12--.

Col. 5, lines 12 and 29, change "N" to --n--.

Col. 6, line 22, change "multiple odd" to --odd multiple--;
line 25, change "N" to --n--;
line 33, delete "OO".

Col. 7, line 44, after "array" insert --,--.

Col. 8, line 28, change "groves" to --grooves--.

Signed and Sealed this

Third Day of August, 1993

Attest:

Michael K. Kirk

MICHAEL K. KIRK

*Attesting Officer*

*Acting Commissioner of Patents and Trademarks*